US005359522A

United States Patent [19]

Ryan

[11] Patent Number: 5,359,522

[45] **Date of Patent: * Oct. 25, 1994**

[54] FLUID DELIVERY CONTROL APPARATUS

[76] Inventor: Michael C. Ryan, 209 Mill St. SW., Mitchelville, Iowa 50169

[ * ] Notice: The portion of the term of this patent subsequent to Apr. 20, 2010 has been disclaimed.

[21] Appl. No.: 59,508

[22] Filed: May 11, 1993

Related U.S. Application Data

[63] Continuation of Ser. No. 902,545, Jun. 22, 1992, abandoned, which is a continuation of Ser. No. 520,727, May 9, 1990, abandoned.

[51] Int. Cl.[5] ........................ G06F 15/20; G06F 7/04; H04B 5/02

[52] U.S. Cl. .................................... 364/465; 235/382; 340/825.34

[58] Field of Search .................... 364/550, 510, 551.01, 364/424.01, 424.03, 424.04, 464.01, 465, 401, 141, 184, 185; 340/933, 438, 439, 457.4, 459, 825.55, 825.54, 825.34; 235/378, 382, 384, 382.5

[56] References Cited

U.S. PATENT DOCUMENTS

| | | | |
|---|---|---|---|
| 3,642,036 | 2/1972 | Ginsburgh et al. | 141/94 |
| 3,650,303 | 3/1972 | Chambers et al. | 141/1 |
| 3,786,421 | 1/1974 | Wostl et al. | 340/149 |
| 3,814,148 | 6/1974 | Wostl | 141/98 |
| 4,067,061 | 1/1978 | Juhasz | 364/424 |
| 4,109,686 | 8/1978 | Phillips | 141/1 |
| 4,258,421 | 3/1981 | Juhasz et al. | 364/424 |
| 4,263,945 | 4/1981 | Van Ness | 235/61 R X |
| 4,344,136 | 8/1982 | Panik | 340/459 X |
| 4,345,146 | 8/1982 | Story et al. | 235/381 |
| 4,469,149 | 9/1984 | Walkey et al. | 141/94 |
| 4,490,798 | 12/1984 | Franks et al. | 364/550 |
| 4,532,511 | 7/1985 | Lemelson | 235/435 |
| 4,563,739 | 1/1986 | Gerpheide et al. | 364/403 |
| 4,627,553 | 12/1986 | Yoshida et al. | 364/465 |
| 4,630,292 | 12/1986 | Juricich et al. | 346/80 X |
| 4,714,925 | 12/1987 | Bartlett | 235/384 |
| 4,752,899 | 6/1988 | Newman et al. | 364/550 |
| 4,804,937 | 2/1989 | Barbiaux et al. | 340/52 |
| 4,846,233 | 7/1989 | Fockens | 141/94 |
| 4,853,859 | 8/1989 | Morita et al. | 364/424.04 |
| 4,897,642 | 1/1990 | Di Lullo et al. | 340/825.54 |
| 4,926,331 | 5/1990 | Windle et al. | 364/424.04 |
| 4,926,494 | 5/1990 | Potter | 340/825.54 X |
| 4,929,818 | 5/1990 | Bradbury et al. | 235/381 |
| 4,934,419 | 6/1990 | Lamont et al. | 364/465 X |
| 4,967,366 | 10/1990 | Kaehler . | |
| 5,025,253 | 6/1991 | Di Lullo et al. | 340/825.54 X |
| 5,058,044 | 10/1991 | Stewart et al. | 340/825.54 X |
| 5,070,328 | 12/1991 | Fockens | 340/825.54 |
| 5,072,380 | 12/1991 | Randelman et al. | 364/406 |
| 5,086,389 | 2/1992 | Hassett et al. | 364/401 |
| 5,204,819 | 4/1993 | Ryan | 364/465 |

FOREIGN PATENT DOCUMENTS

| | | |
|---|---|---|
| 260018 | 6/1986 | France . |
| 0040544 | 5/1981 | United Kingdom . |

OTHER PUBLICATIONS van Tol et al., "Vecom Short Range Communication with Vehicles" *Phillips Telecommunications Review*, vol. 41, No. 3, Sep. 1983, pp. 235-249.

*Primary Examiner*—Thomas G. Black
*Assistant Examiner*—Michael Zanelli
*Attorney, Agent, or Firm*—Kent A. Herink; Brian J. Laurenzo; Brett J. Trout

[57] ABSTRACT

Apparatus for two-way communication of information between a fluid container and a fluid delivery device. The fluid container has an associated first information storage and retrieval device and the fluid delivery device has an associated second information storage and retrieval device. Upon initiation of a fluid delivery transaction a communication link is established between the first and second information storage and retrieval devices and will proceed only if appropriate authorization is received by the second information storage and retrieval device. Information regarding the fuel delivery transaction may be stored on either or both of the storage and retrieval devices and may be communicated to another local or remote device for further processing.

11 Claims, 10 Drawing Sheets

FLUID DELIVERY CONTROL APPARATUS

This application is a continuation of application Ser. No. 07/902,545, filed Jun. 22, 1992, abandoned which is a continuation of U.S. Pat. application Ser. No. 07/520,727, filed May 9, 1990, now abandoned.

BACKGROUND OF THE INVENTION

The present invention relates generally to an apparatus for controlling the delivery of fluid to a container or reservoir and, more specifically, to an apparatus for the exchange of security, identification, and transaction information between a container, such as a fuel or other fluid storage tank, and a fluid delivery system.

The delivery and control of the delivery of fluids is ubiquitous, varying from water, such as for irrigation, liquefied petroleum gas (propane), oxygen and other gasses, and petroleum based fuels such as gasoline and diesel fuel. As a specific example, many vehicles are operated as a part of a commercial enterprise wherein detailed and accurate records are needed to account properly for the use of the vehicle and to support income tax return filings. Very often the vehicle is owned other than by the operator and fuel used by the vehicle is purchased by the absentee owner at the time a fuel delivery is made. Accurate and reliable records are necessary to assure that the appropriate vehicle receives the purchased fuel and, to the extent possible, that the miles logged by the vehicle correspond to actual commercial, not private, use.

SUMMARY OF THE INVENTION

The present invention includes a first information storage and retrieval device associated with a fluid container and a second information storage and retrieval device associated with a fluid delivery system. The first information device is connected to transponders of the fluid container to collect and store certain operating information on the fluid container. If the fluid container is a fuel tank of a vehicle, such information may include the current mileage, current number of operating hours, time, date, and so on. The first information device also contains identification information which identifies the fluid container, the type of fluid it is to hold, and so on, for security and billing purposes. The second information device contains information identifying the fluid delivery system, the price of fluid, quantity and type of fluid being delivered, time, date, and so on. A data communications link interconnects the first and second information devices during a fluid delivery transaction to permit the exchange of information between the two information devices regarding the fluid delivery transaction.

In a preferred embodiment, each of the information devices is connected to an inductive coil for radio frequency communication between the devices. Information from one of the devices is coded into a voltage signal that is sent through the inductive coil. A corresponding voltage signal will be induced in the inductive coil of the other information device and decoded and stored or processed. When the fluid delivery system is delivering, e.g., a petroleum-based fuel to a vehicle, usually via a fuel nozzle inserted into a fuel orifice of the vehicle, the inductive coils are in transmitting and receiving proximity. Signals transmitted by one of the coils will be received by the other coil and communicated to the information device. Alternatively, a direct coupling is used, particularly if a higher transmission rate of the information is needed or desired. Appropriate information regarding the transaction will be recorded and stored at either or both of the information devices for subsequent (possibly on-line in the case of the fluid delivery system information device) communication to a remote location for filing and record keeping purposes.

A feature of the present invention is to provide a fluid delivery control system which is automatically activated when a fluid delivery nozzle is inserted into the corresponding input orifice of a fluid container.

Another feature of the present invention is positive identification of the fluid container for security and billing purposes to help prevent the delivery of fluid to unauthorized containers.

A further feature of the present invention is to permit automatic payment for delivered fluid without the use of an identification card or other like device.

Still another feature is the recordation of relevant information regarding the fluid delivery transaction for the generation of accurate and reliable reports.

Still a further feature permits the secure delivery of fluid from an unattended fluid delivery location.

Still another feature is a system for authorizing and memorializing a fluid delivery transaction that can be wholly controlled by an absent purchaser of the fluid.

Still a further feature is an automatic disabling of the fluid delivery if the delivery nozzle is removed from the corresponding input orifice of the authorized container.

Yet another feature is to provide a fluid delivery control and data exchange system that can be safely used in close proximity to inflammable fluids.

DETAILED DESCRIPTION OF A PREFERRED EMBODIMENT

Figure 1:
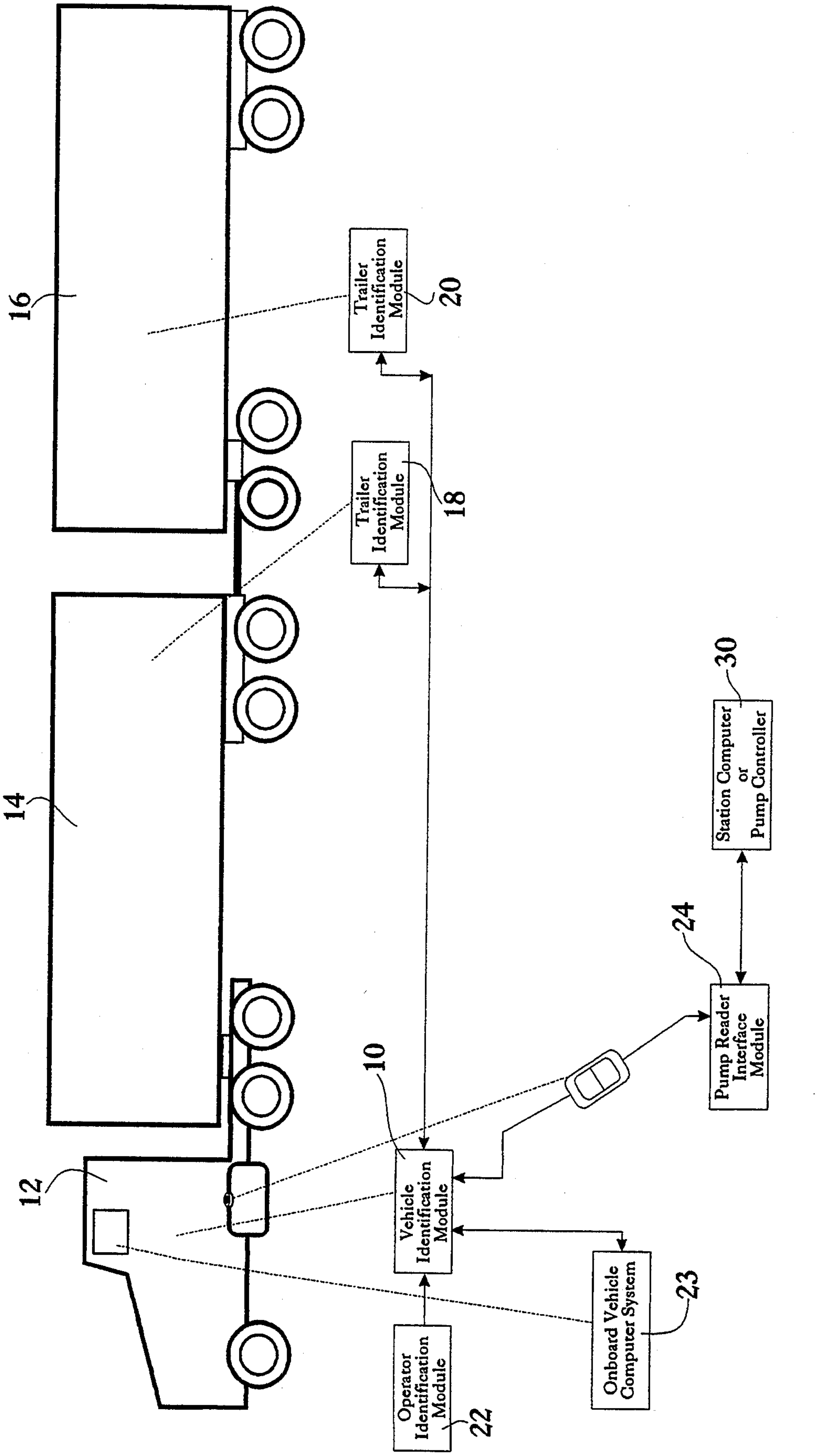
FIG. 1 is a diagrammatical view of a vehicle and two trailers on which a preferred embodiment of the invention has been installed and including a schematic block diagram of the exchange of information between portions of the invention.

A diagrammatical view of the present invention is illustrated in FIG. 1, particularly, a preferred embodiment wherein a vehicle identification module 10 is located on board a truck tractor 12 to which is attached a first trailer vehicle 14 and a second trailer vehicle 16. During the course of operation of the truck tractor 12 and associated trailers 14 and 16, it is desirable to collect, store and transmit a variety of data regarding the vehicle. Examples of such data include hours of engine operation, miles traveled, fuel consumed, fuel cost, dates and times of engine operation, dates and times of fueling operations, manifest information regarding the cargo carried in the vehicles, operator information, and the like. It is also desirable to control refueling operations so that fuel delivered to the vehicle is properly recorded and charged, to prevent theft of fuel, and to provide an easy and convenient method for recording and communicating such information to a central processing location.

In summary, information is collected by sensors located on the truck tractor 12 and associated trailers 14 and 16, or via direct communication from outside devices, and is stored on identification modules. The vehicle identification module 10 is located on the truck tractor 12 and acts as a central collection point. A first trailer identification module 18 is located on the first trailer 14 and a second trailer identification module 20 is located on the second trailer 16. The trailer identification modules 18 and 20 are in communication with the vehicle identification module 10. Information and data collected on the trailer identification modules 18 and 20 may either be communicated at once to the vehicle identification module or may be stored for later communication.

In operation, an operator will enter the truck tractor 12 and will insert an operator identification module 22 into the truck tractor identification module 10. The operator's name, drivers license number, credit information and usage authorization code will be transmitted from the operator identification module 22 to the vehicle identification module 10. If the authorization code is correctly identified by the vehicle identification module as an authorized code, the operator will be allowed to start the engine and drive the truck tractor 12. During operation of the truck tractor 12, the vehicle identification module will collect and record the date and time when the engine was started, miles driven by the truck tractor 12, hours of operation of the engine, and other information as will be described in further detail below.

As described above, a trailer identification module 18 is located on board the first trailer 14. The first trailer identification module 18 has recorded on it a trailer identification number and the accumulated mileage that the first trailer 14 has been pulled by a tractor. Upon connection of the truck tractor 12 to the first trailer 14, a radio frequency (RF) communication link is established between the vehicle identification module 10 and the trailer identification module 18. The vehicle identification module 10 reads from the trailer identification module 18 the trailer identification number and accumulated mileage total. Additionally, the vehicle identification module 10 authorizes the release of the air brakes of the trailer 14, as will be described in further detail below, to allow the trailer 14 to be towed behind the truck tractor 12. As the trailer 14 is towed, the distance traveled is communicated from the vehicle identification module to the trailer identification module 14 where it is used to increment the accumulated mileage. Upon disconnect of the truck tractor 12 from the first trailer 14, the accumulated mileage is written to nonvolatile memory on the trailer identification module 18 where it will be retained until the trailer 14 is again connected to a truck tractor that is equipped with the appropriate apparatus of the present invention.

The second trailer identification module 20 is located on board the second trailer 16 and functions identically to that of the first trailer identification module 18 upon its connection to the truck tractor 12 behind the first trailer 14. The trailer identification numbers, elapsed mileage on the trailers 14 and 16, and other information may be stored at the vehicle identification module 10 for bookkeeping and data collection purposes as will be described below.

The nonvolatile memory of the trailer identification modules 18 and 20 can also be used to store manifest information regarding the contents of the trailer, either when such contents are loaded or from the vehicle identification module 10. Such manifest information, as well as other information stored in the nonvolatile memory of the trailer identification modules 18 and 20, can be communicated to the vehicle identification module 10, to a remote device via a communication link, and/or to a portable storage device such as a memory key available from Datakey Corporation, Burnsville, Minn., or a passive transponder with embedded memory such as is available from NDC Automation, Inc., 3101 Latrobe Drive, Charlotte, N.C.

Figure 2:
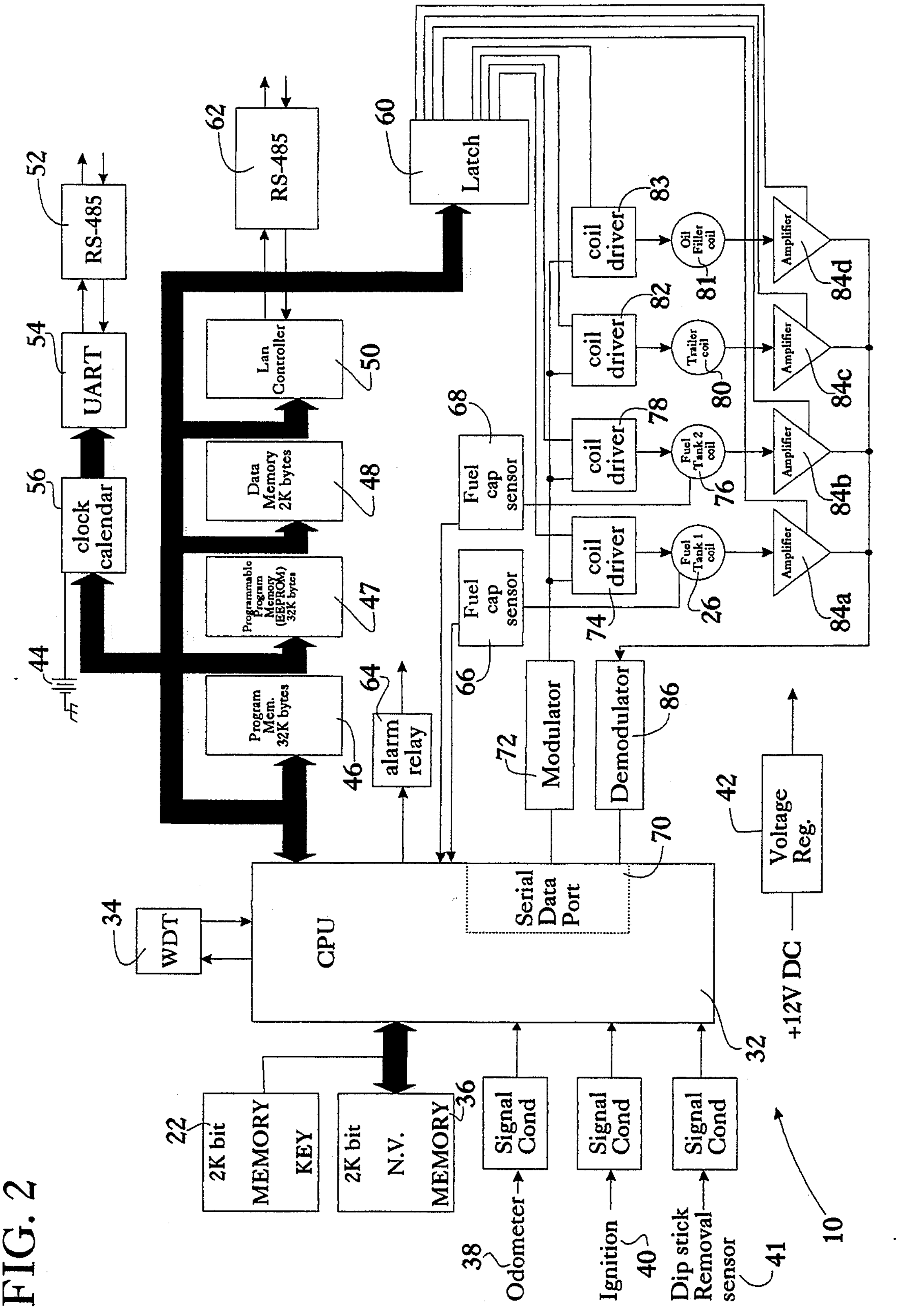
FIG. 2 is a schematic block diagram of a truck tractor vehicle identification module portion of the apparatus of the present invention associated with the vehicle.

A refueling operation will now be described. In the most common situation, the truck tractor 12 will drive up to a fuel delivery location such as a fuel service station. In a preferred embodiment of the invention, a fuel pump module 24 (FIG. 1) is located at the pump which is used to deliver fuel to the truck tractor 12. The fuel pump location includes the usual fuel nozzle which is inserted into a filler neck of a fuel tank of the truck tractor 12. Associated with the filler neck of the truck tractor 12 is an inductive coil 26 (FIG. 2). A similar fuel nozzle coil 28 (FIG. 7) is associated with the fuel nozzle of the fuel pump. The fuel tank coil 26 is in communication with the vehicle identification module 10 and the fuel nozzle coil 27 is in communication with the fuel pump module 24. Voltage signals present in either coil will be transmitted to and received by the other coil when they are in communicating proximity. In this manner, the vehicle identification module 10 and the fuel pump module 24 can intercommunicate during a fuel delivery operation.

Upon insertion of the fuel nozzle into the filler neck of the truck tractor 12, the fuel pump module 24 sends an inquiry signal to the vehicle identification module 10. In response to the inquiry signal, the vehicle identification module 10 transmits an authorization code to the fuel pump module 24 together with the vehicle identification number of the truck tractor 12, the time, date, odometer and engine hour readings, the operator's name and license number, and the trailer identification numbers and odometer readings of the two trailers 14 and 16. If the authorization code is correct, the fuel pump module 24 will activate the fuel pump to permit the delivery of fuel to the fuel tank of the truck tractor 12. The cost of the fuel being delivered, the fuel type, the volume of fuel, the fuel pump identification code, and the station identification number are all transmitted from the fuel pump module 24 to the vehicle identification module 10. At short intervals during the fuel delivery operation, the fuel pump module 24 continues to inquire for the authorization code from the vehicle identification module 10. If the appropriate authorization code is not received, the fuel pump module 24 will turn off the fuel pump and in this way prevent delivery of fuel to an unauthorized vehicle or fuel tank.

Information collected by the fuel pump module 24 may either be stored for subsequent collection and processing or may be transmitted to a remote location. Such information may also be stored on the vehicle identification module 10. For example, the fuel pump module 24 may be directly connected to a station computer or pump controller 30 (FIG. 1) which will subsequently transmit the information, e.g., over telephone lines, to the owner of the truck tractor 12 and, in certain circumstances, to the appropriate financial institution for payment to the fuel pump owner for the fuel delivery made to the truck tractor 12.

A schematic diagram of the vehicle identification module 10 is illustrated in FIG. 2. Principle control of the vehicle identification module 10 is accomplished by a central processing unit 32 to which is attached a watch dog timer 34. Information or data from the operator identification module or memory key 22 is communicated both to the CPU 32 and to a 2K bit nonvolatile memory storage device 36 where it will be stored for access by the CPU. Odometer and engine hour information is communicated to the CPU from transponders 38 and 40, respectively.

Power voltage is supplied to the CPU through a 5-volt output voltage regulator 42 connected to the 12 volt electrical system of the truck tractor. Instruction coding or programs for the operation of the CPU 32 are stored on a 32K byte memory device 46 and a 2K byte data memory device 48 is provided for the storage of data collected and processed by the vehicle identification module 10. A 32K byte programmable memory device (EEPROM) 47 serves as a means for modifying or updating the program for controlling the operation of the vehicle identification module 10. If the program originally stored on the 32K byte RAM device 46 is to be changed, a new program can be stored on the EEPROM 47 via an appropriate communication link (including the inductive coils described below). The new program will include the instructions necessary to effectively debillitate the original program stored on the RAM device 46. In this way, the program can be changed, altered, or updated as desired and from a remote location without substitution of a memory chip or device. A local area network (LAN) controller 50 handles the communication of data and instructions between various elements of the vehicle identification module 10.

Communication between the vehicle identification module 10 and an on board computer 23 is accomplished through an RS485 communication link 52 which is connected to an SAE bus of the on-board computer system. The RS485 communication link 52 communicates with a UART 54 which in turn communicates with a clock calendar 56. The memory devices 46 and 48, the LAN controller 50 and the clock calendar 56 are all connected to the central processing unit 32 by way of a communication bus 58. Also connected to the communication bus 58 is a latch 60 which is used to operate the several input and output devices as will be described in further detail below. Additionally, the LAN controller 50 can communicate with a data collection device sold by Xata Corporation, Burnsville, Minn., via a second RS485 communication link 62.

An alarm relay 64 is connected to the CPU 32 and operated thereby to sound an alarm (not shown) if an alarm condition is sensed by the central processing unit 32.

A pair of fuel cap sensors 66 and 68 are connected to the central processing unit 32 to send a signal when the corresponding fuel cap has been removed to permit access to a fuel tank of the truck tractor 12.

An oil dipstick removal sensor 41 is connected to the CPU 32 to record the date, time, and operator identification on the vehicle identification module 10 of each time the oil dipstick of the tractor 12 is removed during the monitoring of the oil level.

The vehicle identification module 10 is connected to four antennae in the preferred embodiment. A fuel tank coil 26 is associated with one of the fuel tanks of the truck tractor 12 and a second fuel tank coil 76 is associated with the second fuel tank. A third coil, the trailer coil 80, is mounted at the rear of the truck tractor 12 for communication with the trailer 14 as described above. The vehicle identification module 10 includes an appropriate receptacle for a 2K bit memory key 22 from which is downloaded the operator identification code and company authorization code. A 2K bit nonvolatile memory device 36 contains the identification code of the vehicle identification module 10 and the fuel type required by the truck tractor 12.

As described above, the fuel tank coil 26 is positioned around the filler neck of a fuel tank of the truck tractor 12. Voltage signals from a serial data port 70 of the central processing unit 32 are communicated to the fuel tank coil 26 through a modulator 72 and a coil driver 74. A signal present at the coil driver 74 will be communicated to the fuel tank coil 26 if the latch 60 has provided the appropriate enable signal to the coil driver 74. A second fuel tank coil 76 is provided which is driven by a second coil driver 78. Communication between the truck tractor 12 and the trailer 14 may be accomplished by a trailer coil 80 and a corresponding coil driver 82 as will be described in more detail below. An oil filler neck coil 81 is provided around the engine oil filler neck of the engine which is driven by a coil driver 83. Of course, the coil drivers 78, 82, and 83 are also enabled by signals from the latch 60.

The coils 26, 76, 80, and 81 can also function as receivers. Voltage signals induced in the coils 26, 76, 80, and 81 are amplified in an amplifier 84(*a*)–(*d*) and are communicated to the serial data port 70 of the central processing unit 32 through demodulator 86 provided the appropriate enable signal has been received by the amplifier 84(*a*)–(*d*) from the latch 60.

In the preferred embodiment, the fuel tank coils 26 and 76 are made of 13 six-inch diameter turns of 26 gauge copper wire that are embedded in a silastic rubber potting material surrounded by a polyethylene cover. A 0.1 micro farad capacitor is connected across the lead wires of the coil. Together the capacitor and inductance of the coil create a tuned circuit resonant at approximately 61 kilohertz. The drive signal is at approximately five volts, peak-to-peak and a frequency of 60 kilohertz for a binary one. The fuel nozzle coil 28 is similarly constructed so that the coils 28 and 26 or 76 are matched for efficient intercommunication. In tests, the coils 28 and 26 of 76 described above have a read-write distance of approximately eighteen inches. In other circumstances where the read-write distance must be greater, for example if the intercommunication coils are mounted on facing surfaces of the truck tractor and an adjacent trailer, a larger diameter coil can be constructed and will function at the above frequencies provided the inductance of the coil remains substantially the same. A pair of fourteen-inch diameter coils have a read-write distance of approximately six feet.

If an on board computer 23, for example, a computer manufactured by Xata Corporation, the vehicle identification module will function essentially as a communication link between the fuel pump identification module 24 and the on board computer 23. If no on board computer system is present, transponders transmit odometer and engine hour information to the central processing unit 32 of the vehicle identification module 10.

Figure 3:
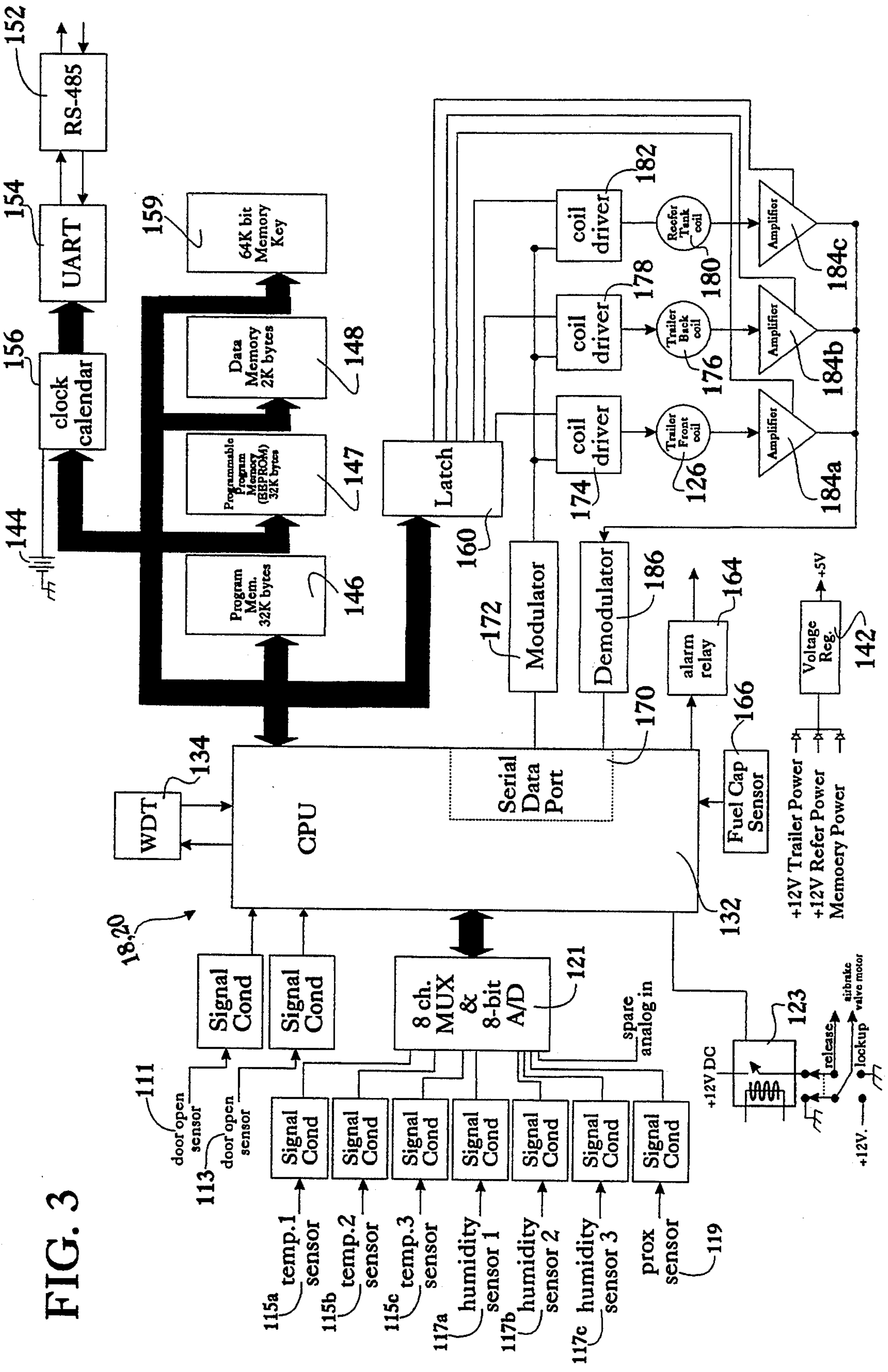
FIG. 3 is a schematic block diagram of a truck trailer identification module portion of the apparatus of the present invention.

A schematic diagram of the trailer identification modules 18 and 20 are illustrated in FIG. 3. Many of the principle elements of the trailer identification modules 18 and 20 are identical to that of the vehicle identification module 10 and are denoted with 100 series numbers corresponding to the numbers assigned to corresponding elements of the vehicle identification module 10. Also attached to the data bus 158 is a 64K bit memory key device 159 which can be used to transmit up to 64K bits of information from the memory key device 159 to the trailer identification module 18 or 20 or which can store up to 64K bits of information from the trailer identification module 18 or 20. The trailer identification module 18 or 20 monitors the condition of a pair of doors of the trailer 14 or 16, respectively, by way of door open sensors 111 and 113 which are connected to the central processing unit 132. A plurality of other sensor or transponder units such as the temperature sensors 115*a–c*, humidity sensors 117*a–c* and a proximity sensor 119, are used to monitor the temperature and humidity inside the trailer 14 and, with respect to the proximity sensor 119, the proximity of the rear of the trailer 14 to an unloading device or location. The sensors 115, 117, and 119 are analog sensors which produce voltage signals corresponding to the conditions they are sensing. The analog signals are conditioned and sent to an 8-channel multiplexor and analog digital convertor 121 which provides an interface between the central processing unit 132 and the sensors so that information collected by the sensors can be stored or processed by the central processing unit 132. Additional sensors or transponders could be used for sensing engine operating parameters of the reefer power unit, for example. In the event greater than eight sensors or transponders are used additional multiplexor channels can be added.

A motor driven valve 123 for the control of the air brakes of the trailer 14 is illustrated at 123. If no signal is received from the central processing unit 132, the motor drive value 123 will remain closed and thus prevent the air brakes from releasing. The brakes of the trailer 14 will thus be applied and prevent the trailer 14 from being moved by a tractor unit. Only if a signal is received from the CPU 132 will the motor driven value 123 open to permit release of the air brakes and movement of the trailer 14. At unhook of the trailer 14 from the tractor 12, the motor driven valve 123 must be driven closed by the operator while a safety button is held closed. Once driven closed, the motor driven valve 123 can only be released if it receives the proper authorization code from the vehicle identification module 10.

Figure 4:
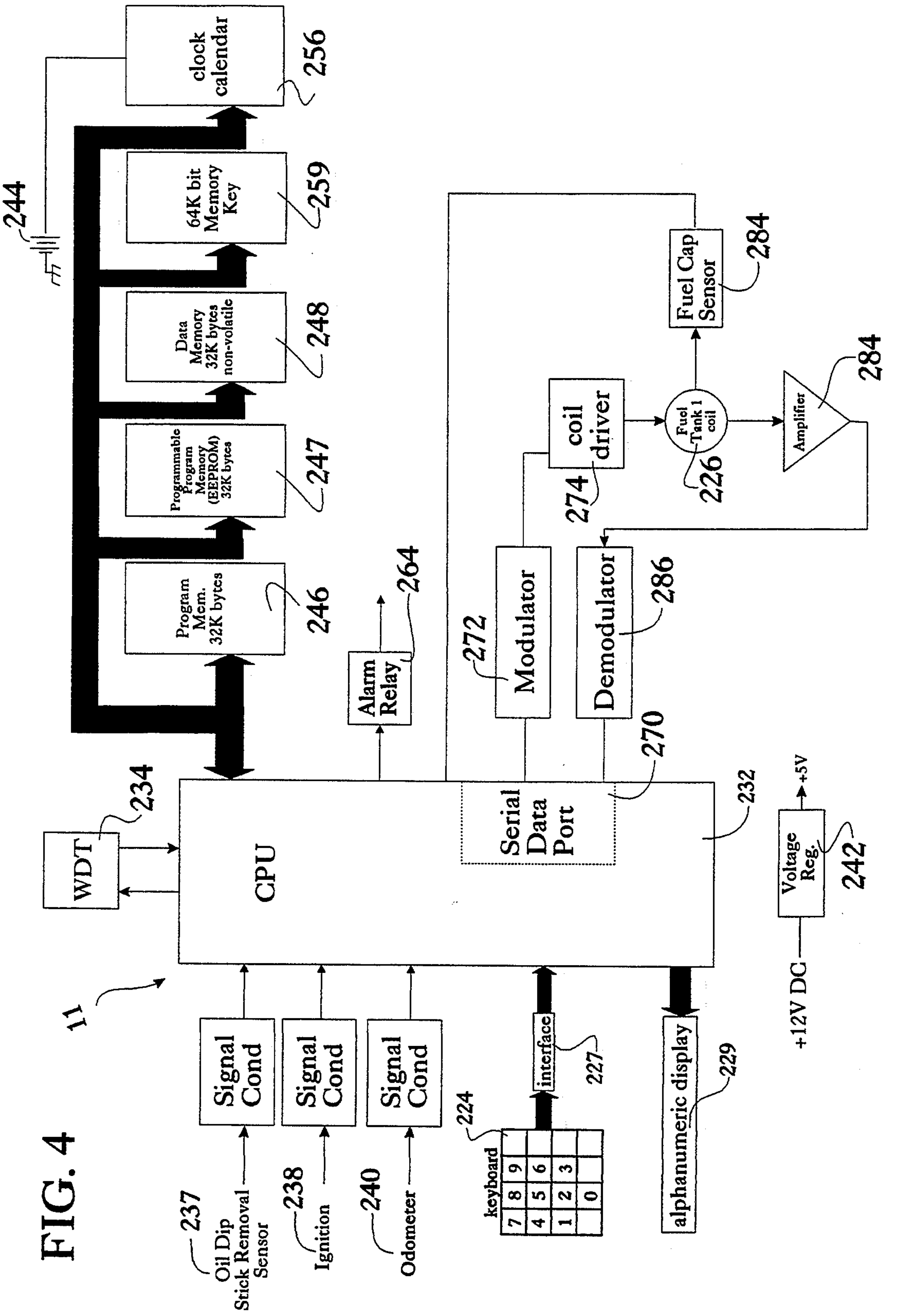
FIG. 4 is a schematic block diagram of an automobile identification module portion of the apparatus of the present invention.

An automotive module 11 that is similar in construction and operation as the vehicle module 12 is illustrated schematically in FIG. 4 with 200 series figure numbers used to identify elements of the automotive module 11 that correspond to elements of the vehicle identification module 10 and trailer identification module 18. An oil dipstick removal sensor 237 has been added to record the time and date of removal of the oil dipstick, presumably to check the engine oil level. Additionally, a keyboard 225 and interface 227 are provided for the manual input of information to the central processing unit 232. An alphanumeric display 229 is also provided to display information being input from the keyboard 225 and information coming from the central processing unit 232.

It may be desired to use the present invention to monitor the use and operation of the vehicles other than a truck tractor and trailer. For example, an identification module similar to the vehicle identification module 10 and vehicle identification module 11 may be provided on mobile equipment such as a tractor, road grader, dump truck, or any other piece of mobile equipment. A mobile equipment identification module 13 is illustrated schematically in FIG. 5 with 300 series numbers identifying elements of the mobile equipment identification module 13 that correspond to elements of the identification modules 10 and 11.

The vehicle identification module 10 thus functions as an information storage and retrieval device for operating and environmental conditions of the trailers as well as manifest information regarding cargo carried in the trailers. This capability of the vehicle identification module 10 is of particular utility for storing other information unrelated to a fuel delivery transaction. For example, service operations performed on the vehicle can be stored on the vehicle identification module to provide an accumulated service history of the vehicle that is carried with the vehicle itself. In another application, a device similar to the trailer identification module 18 or 20 could be associated with an underground storage tank. Sensors or transponders for detecting the presence of leaking fuel from the underground storage tank would be connected to the CPU 132 in the same manner as the sensors 115–119 shown in FIG. 3. The underground storage tank module would thus function as an automatic leakage monitoring system in addition to its two-way fuel delivery transaction identification and storage and network capabilities.

In addition, a 4-channel multiplexor and analog digital convertor 331 is provided for the purpose of permitting the storage and processing of information from transponders or sensors as may be appropriate for the particular piece of mobile equipment to which the identification module 13 is attached. In other respects, the mobile equipment identification module 13 will function similarly to the identification modules 10 and 11 described above.

Figure 6:
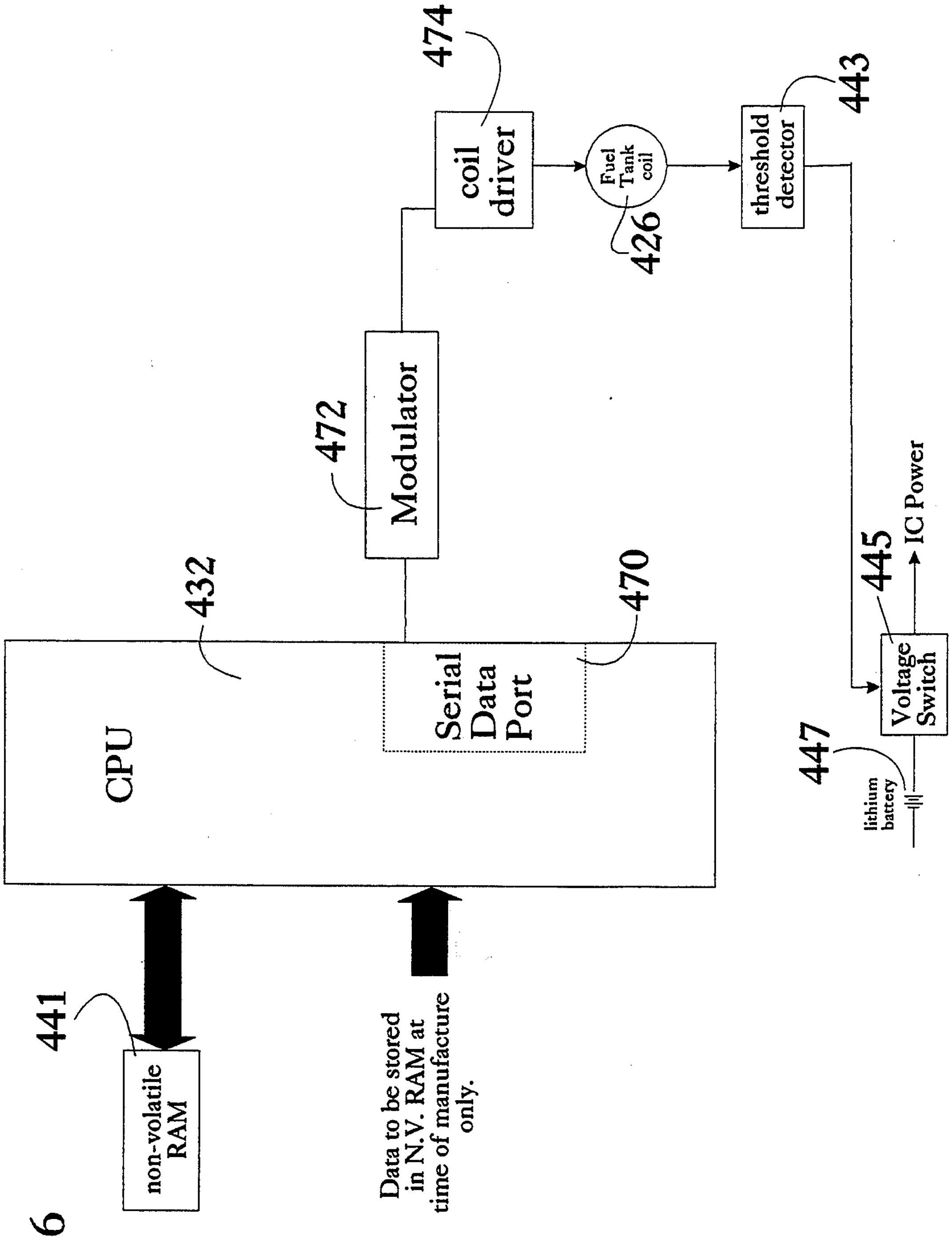
FIG. 6 is a schematic block diagram of a mobile equipment identification module portion of the apparatus of the present invention.

The invention can also be adapted to function with equipment which use petroleum fuel or other fluids but are not necessarily mobile or used on a frequent or continuous basis. In such circumstances, it is desirable to have an identification module which is of low power consumption so that it can be battery operated over a reasonable lifetime. A schematic diagram of a low-power identification module 15 is illustrated in FIG. 6 with 400 series numbers identifying elements that correspond to elements of the other identification modules. The central processing unit is a low power CPU 432 with read only program memory and a serial data port 470. It is interconnected with a non-volatile RAM memory device 441 to which is written identification and authorization information at the time of manufacture. In a manner similar to the other identification modules, the low-power identification module can transmit information from the CPU 432 via a fuel tank coil 426 by way of a modulator 472 and coil driver 474. To conserve power, the central processing unit 432 is turned on only when a threshold detector 443 senses that a fuel nozzle has been inserted into the filler neck of the equipment to which the low power identification module 15 has been attached. The threshold detector 443 activates a voltage switch 445 which then supplies power from a lithium battery 447 to the CPU 432.

Figure 7:
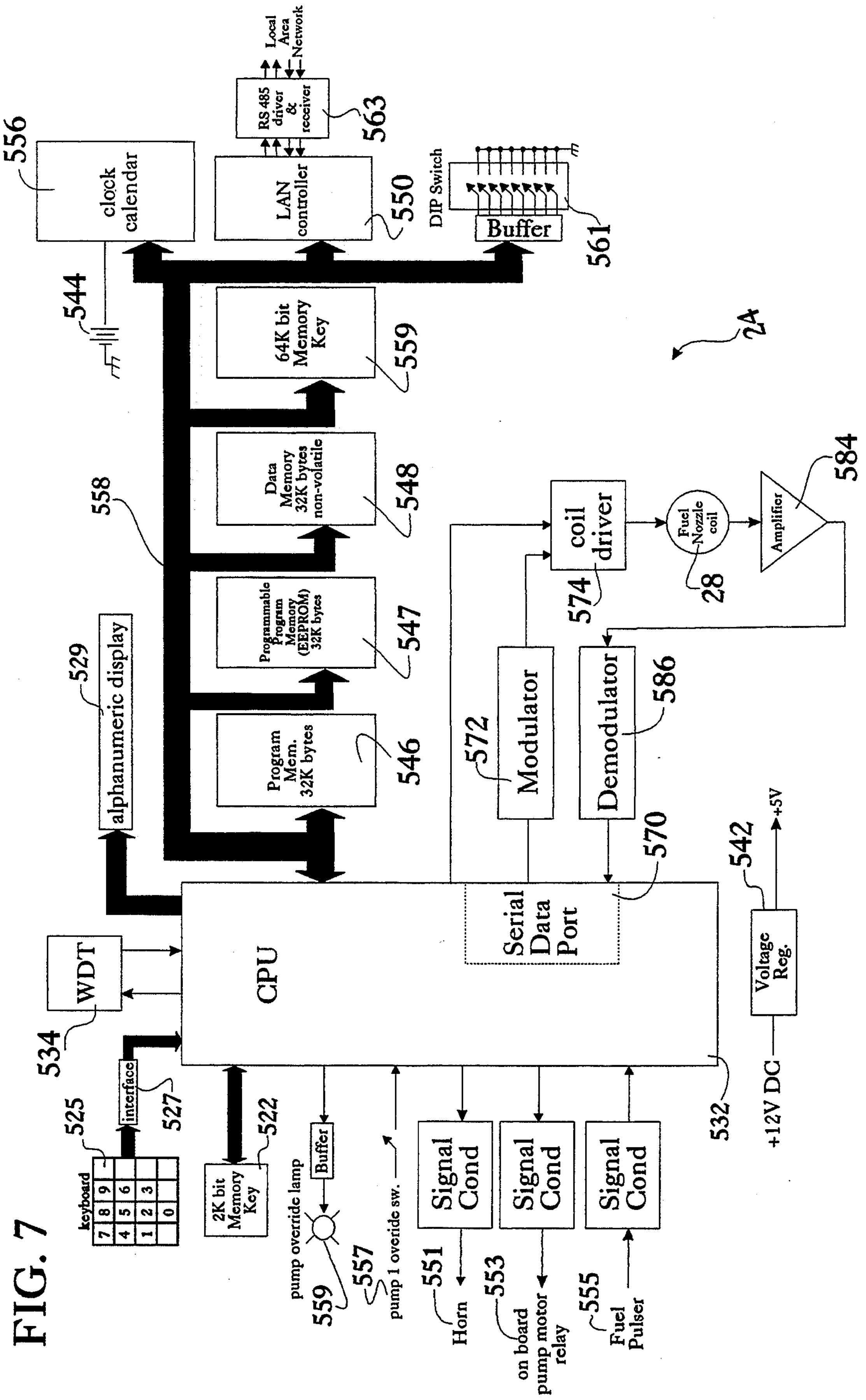
FIG. 7 is a schematic block diagram of a fuel pump module portion of the apparatus of the present invention.

A schematic diagram of the gas pump module 24 is illustrated in FIG. 7, with 500 series numbers identifying elements corresponding to the elements of the other identification modules. As described above, the fuel pump module 24 controls the delivery of fuel from a fuel pump to a vehicle and receives, transmits, and records information regarding the fuel delivery operation and the operating history of the vehicle. Also included in the fuel pump module 24 are a plurality of signal input and output devices. A horn 551 is provided which can be activated by the central processing unit 532 as an alarm device. A fuel pump motor 553 of the fuel pump is controlled by a signal from the central processing unit 532 to permit delivery of fuel only to an authorized vehicle as will be described in more detail below. A pulse from the fuel pump motor corresponding to the volume of fuel being delivered is received in the CPU 532 for recording of the amount of the fuel delivery. Finally, an override system is provided consisting of an override switch 557 and a pump override lamp 559 to permit the delivery of fuel to an authorized vehicle that is not equipped with one of the vehicle identification modules described above. The required authorization code is input from a 2K bit memory key.

A DIP switch 561 can be selectively encoded to identify the individual fuel pump on which the fuel pump module 24 is located as well as the fuel type that is delivered by the fuel pump. It is interconnected to the CPU 532 by way of the data bus 558. Additionally, intercommunication between a central computer and the fuel pump module 24 is provided by an RS485 driver and receiver 563 through the LAN controller 550 and data bus 558.

As an alternative, information and data collected by the gas pump module 24 can be stored over a period of time and then transferred to the 64k bit memory key 559. Data and information stored on the memory key 559 can subsequently be transferred or downloaded for further processing by a memory key reader module 21 as will be described in more detail below.

As an alternative to a stationary fuel pump location, fuel may be delivered to vehicles by a mobile pump truck. Included in the invention is a pump truck module 17 which is illustrated schematically in FIG. 8, with 600 series numbers identifying elements corresponding to similar elements of the other identification modules described previously.

The pump truck module 17 differs in that seven transmit and receive coils 76 are provided, four of which are associated with delivery hoses, two of which are associated with input filler necks for the tanks of the pump truck, and one of which is associated with the filler neck of the fuel tank of the pump truck itself. Each coil 76 has an associated coil driver 74 and output amplifier 84. A transmit coil latch 660*a* sends enable signals from the CPU 632 to the coil driver 74. Correspondingly, a receiving coil latch 660*b* enables the amplifiers 84.

A DIP switch 661 is used to input the fuel type into the central processing unit 632. A variety of input and output signals communicate information between the central processing unit 632 and remote sensors and equipment. Included are a pair of pump override switches 657*a* and 657*b* and associated pump override lamps 659*a* and 659*b* which will permit the delivery of fuel to authorized vehicles which do not have an appropriate identification module of this invention, as will be described in greater detail below. A fuel valve 663(*a*)–(*d*) is associated with each of the four hoses for the delivery of fuel from the pump truck. The fuel valves 663(*a*)–(*d*) will be opened by the central processing unit 632.

Figure 9:
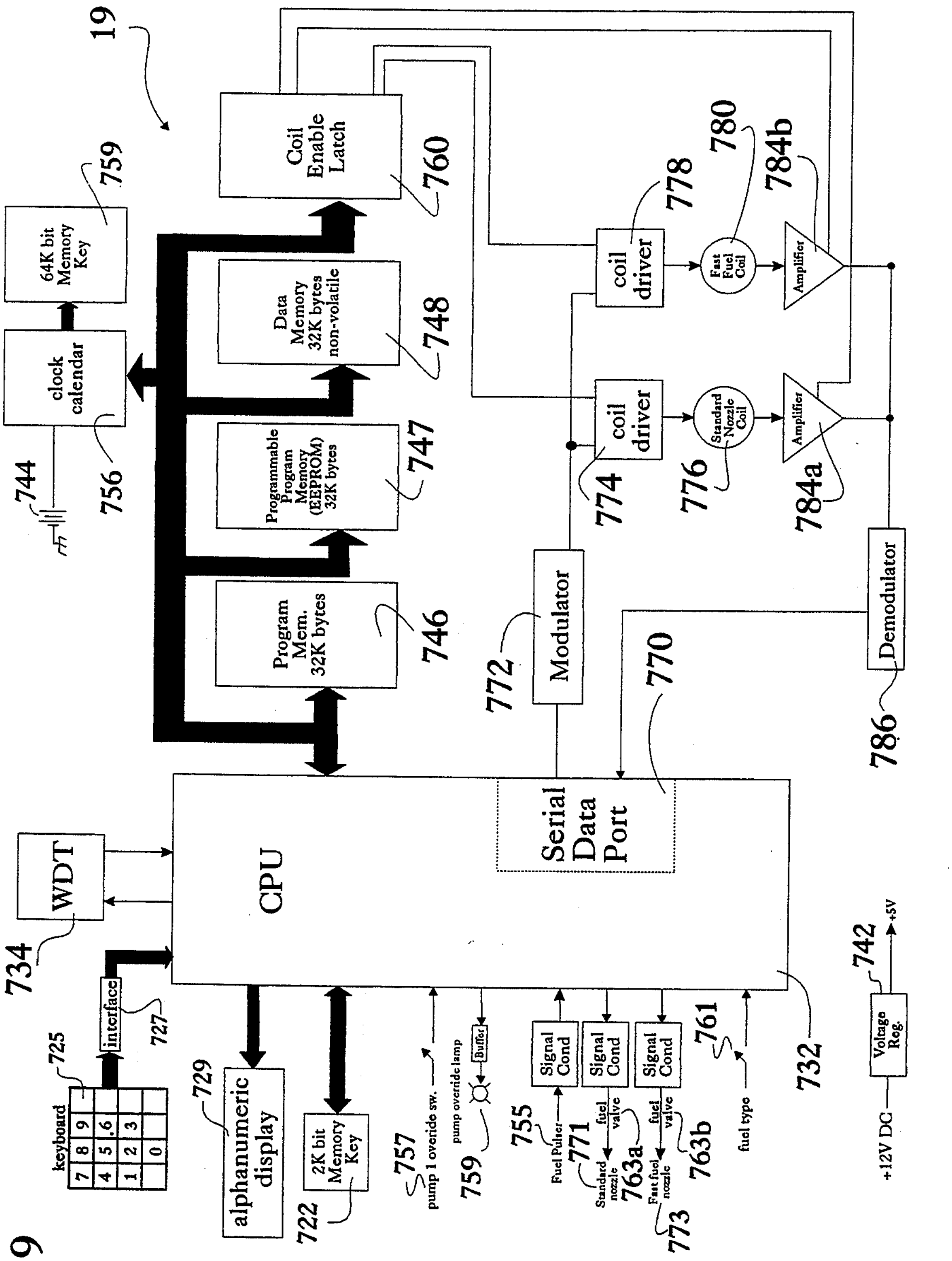
FIG. 9 is a schematic block diagram of a stationary fuel tank module portion of the apparatus of the present invention.

Illustrated schematically in FIG. 9 is a stationary tank module 19, with 700 series numbers identifying elements corresponding to the elements of the other identification modules described previously. Unique to the stationary tank module 19 are a pair of distinct fuel delivery systems, one of which is at the standard volume rate via the standard nozzle 771 and the other of which is a fast fuel delivery nozzle 773 for the delivery of fuel at an increased volume rate for the filling of pump trucks and the like. Because the stationary tank module 19 may be at a remote location without ready access to an outside power source, it is anticipated that power be supplied from either a lithium battery, a solar battery recharge system, an umbilical power cord 633 between a pump truck and the stationary tank module 19, or if available by a direct link to 110 volts AC or 12 volts DC.

A fuel delivery operation between a truck tractor which carries a vehicle identification module 10 and a fuel pump location having a fuel pump identification, module 24 begins when the truck tractor 12 pulls into a fuel delivery location. The operator inserts the memory key 22 into an appropriate receptacle associated with the fuel pump identification module 24. The memory key 22 carries the operator identification and authorization code required for fuel delivery, and will serve as a portable memory module on which the fuel delivery operation or a plurality of fuel delivery operations can be recorded.

The operator will remove the fuel cap from the fuel tank of the truck tractor 12. Upon its removal, the time and date of the same will be recorded on the vehicle identification module 10. The operator will then insert the fuel nozzle of the fuel pump into the filler neck of the fuel tank. When the fuel nozzle coil 28 is in communicating proximity to the fuel tank coil 26, the fuel tank coil 26 will receive an inquire signal from the fuel nozzle coil 28. Upon receipt of the inquire signal, the vehicle identification module 10 will transmit its authorization code and fuel type code. If the authorization code is recognized by the fuel pump module 24, the delivery of fuel will begin. The vehicle identification module 10 will also transmit the driver's license and state code number, the license number and state code of the truck tractor 12, the truck tractor 12 engine hours and odometer reading, the license number and state code of any trailers 14 and/or 16, and the odometer readings of the trailers.

During the fuel delivery operation, the fuel pump identification module 24 continues to require an authorization code from the vehicle identification module 10. If no authorization code is received, the fuel delivery will be discontinued. In the preferred embodiment, an inquire signal is transmitted at every one second interval. Accordingly, if the fuel nozzle is withdrawn from the filler neck of an authorized vehicle, the delivery of fuel will be promptly interrupted.

The fuel pump is equipped with a pulser which sends a signal that corresponds to a preselected volume of delivered fuel, e.g., a pulse for every one-tenth of a gallon. In this way, the fuel pump identification module 24 can keep track of the volume of fuel delivered to an authorized vehicle. This information is transmitted to and stored by the vehicle identification module 10.

The fuel pump identification module 24 can also request and receive complete diagnostic engine data from a S.A.E. J1708 network bus of the truck tractor 12 if it is so equipped. The fuel pump identification module 24 may also be provided with a keyboard which can be used to input information directly to the fuel pump identification module 24. The keyboard can be used, for example, if fuel is to be delivered to a truck tractor that is not equipped with a vehicle identification module 10. In this mode, an authorization code would be input into the keyboard by the operator. Another override function is provided by the 2K memory key 522 that must be inserted by the operator into the appropriate module of the fuel pump identification module. The memory key 522 identifies the operator and provides the appropriate authorization code which will permit a fuel delivery operation to proceed in an override condition.

Information and data received by the fuel pump identification module 24 may be transmitted to a remote location such as a main frame company computer via telephone lines in the usual method or via cellular telephone intercommunication. Alternatively, a local personal computer or similar computing device may be located at the service station of the fuel pump and which is in communication with each fuel pump identification module 24 at the service station location. A hard copy of the fuel delivery transaction is printed by the personal computer and may be stored by the owner of the service station, with a copy going to the truck tractor operator and to the owner of the truck tractor. If the fuel pump identification module is connected so as to transmit information to a remote computer, the invention can be used to provide automatic data capture to allow for electronic funds transfer or ACH payment of fuel purchases and to permit generation of accounts receivable, inventory, fleet management, stocks depletion, and excise tax accounting reports of interest to the owner of the truck tractor and of the service station.

Information and data may be exchanged between the vehicle identification module and the trailer identification module either by way of a hard-wired RS232 or RS485 communication link or by intercommunicating coils similar to the fuel tank and fuel nozzle coils described above. The advantage of the intercommunicating coils is that no independent, hard-wired connection is required, so that the connection is not subject to degradation under the severe environmental and use conditions experienced by over-the-road trucks. A truck tractor coil is mounted on the rear of the truck tractor so that it will be in communicating proximity to a trailer coil that will be mounted on the front end portion of the trailer 14. Alternatively, the tractor coil could be mounted under the fifth-wheel hub and above the frame of the tractor; the trailer coil would then be mounted on the trailer floor so that it will be above the tractor coil when the trailer is connected to the fifth wheel. Or, the tractor coil is embedded in the casting of the fifth-wheel hub and the trailer coil in the fifth-wheel plate of the trailer. Information collected by the trailer identification module 18 can thus be communicated to the vehicle identification module 10 and, conversely, odometer and time and date information can be transmitted from the vehicle identification module 10 to the trailer identification module 18. A similar set of coils are provided between the first trailer 14 and the second trailer 16 so that intercommunication between the vehicle identification module 10 and the second trailer identification module 20 can occur.

The fuel pump identification module 24 is also provided with a DIP switch 561 which can be used to set an identification code for the fuel pump identification module 24. Further, the module 24 accepts a 64K bit memory key 559 to which may be written fueling data that has been stored at the fuel pump identification module 24, which is necessary if the fuel pump identification module 24 is not linked for communication to a remote data capture unit as described above.

At hook up of the truck tractor 12 and the trailer 14, an authorization code is transmitted from the truck tractor 12 to the trailer 14 through the coils 80 and 126. If the trailer identification module 18 recognizes the authorization code, it will respond with its resident identification code and totalized mileage. This information is stored at the vehicle identification module 10. If manifest information has been stored at the trailer identification module 18, it will also be transmitted for storage at the vehicle identification module upon hookup.

If the trailer 18 is a refrigerated trailer, or "reefer" the vehicle identification module will request a systems check of the conditions, for example temperature and humidity, inside the refrigerated trailer. Such information is available on the trailer identification module from its sensors 115 and 117. Additionally, whether the doors are open on the refrigerated trailer could be monitored as well as fuel level in the engine which powers the refrigeration unit of the refrigerated trailer.

The trailer identification module 18 is connected to the electrical system of the truck tractor 12. When the trailer 14 is unhooked from the truck tractor 12, the trailer identification module 14 senses the loss of power and built in capacitors provide the power to write data to nonvolatile memory of the trailer identification module 18 for storage. In this way, total accumulated mileage of the trailer 14 is always available from the trailer identification module 18 even though it may not be always powered.

If the trailer 14 is a refrigerated trailer, power will be available from the refrigerated unit.

An information and power input module is located at the rear of the trailer 14 and communicates with the trailer identification module 18. Information regarding the manifest or cargo to be carried by the trailer 14 can be input via this communication linkage which is connected to the RS485 driver 152 of the trailer identification module 18.

A theft prevention function is built in to the trailer identification module 18. If, at the time of hookup, the trailer identification module 18 receives an appropriate company authorization code, the motor driven valve 123 is opened and the air line is opened to the air brakes of the trailer 14. When the truck tractor 12 is unhooked from the trailer 14, the operator will hold a switch down and manually drive the solenoid to the closed position to put the trailer in a "safe" condition.

The automotive identification module 11 (FIG. 4) functions very similarly to the vehicle identification module 10, and as explained above, has similar components. A 2K memory key 222 is inserted by an operator into an appropriate receptacle of the automotive identification module 11. The automotive identification module records the operator's identification number and authorization code and records on the memory key 222 the time and date every time that the automobile engine is started and stopped along with a chart of accounts and a business or personal mileage designation. Additionally, the vehicle identification code is written to the memory key 222 upon its insertion by the operator.

A 64K memory key 259 is used with the automotive identification module 11 to act as a portable random access memory device for data and information storage and downloading of such information which is written to the key by the automotive identification module 11. Inputs from the odometer 240 and ignition transponders 238 are written to the memory key 259 when the vehicle is started and stopped so as to provide a corresponding log of miles and engine hours along with the clock time of starting and stopping of the automobile. An optional keyboard 225 can be used to provide a means for inputting a chart of accounts and for selecting a credit card identification code which is stored in the memory of the automobile identification module 11 to provide authorization for payment of fuel via the stored credit card information. This credit card information can be accessed only through the inductive link between the coils of the fuel nozzle and the fuel filler neck. While the automobile identification module 11 is primarily powered by power from the battery of the automobile, a lithium battery 244 is provided for backup power for the clock/calendar module 256.

Figure 5:
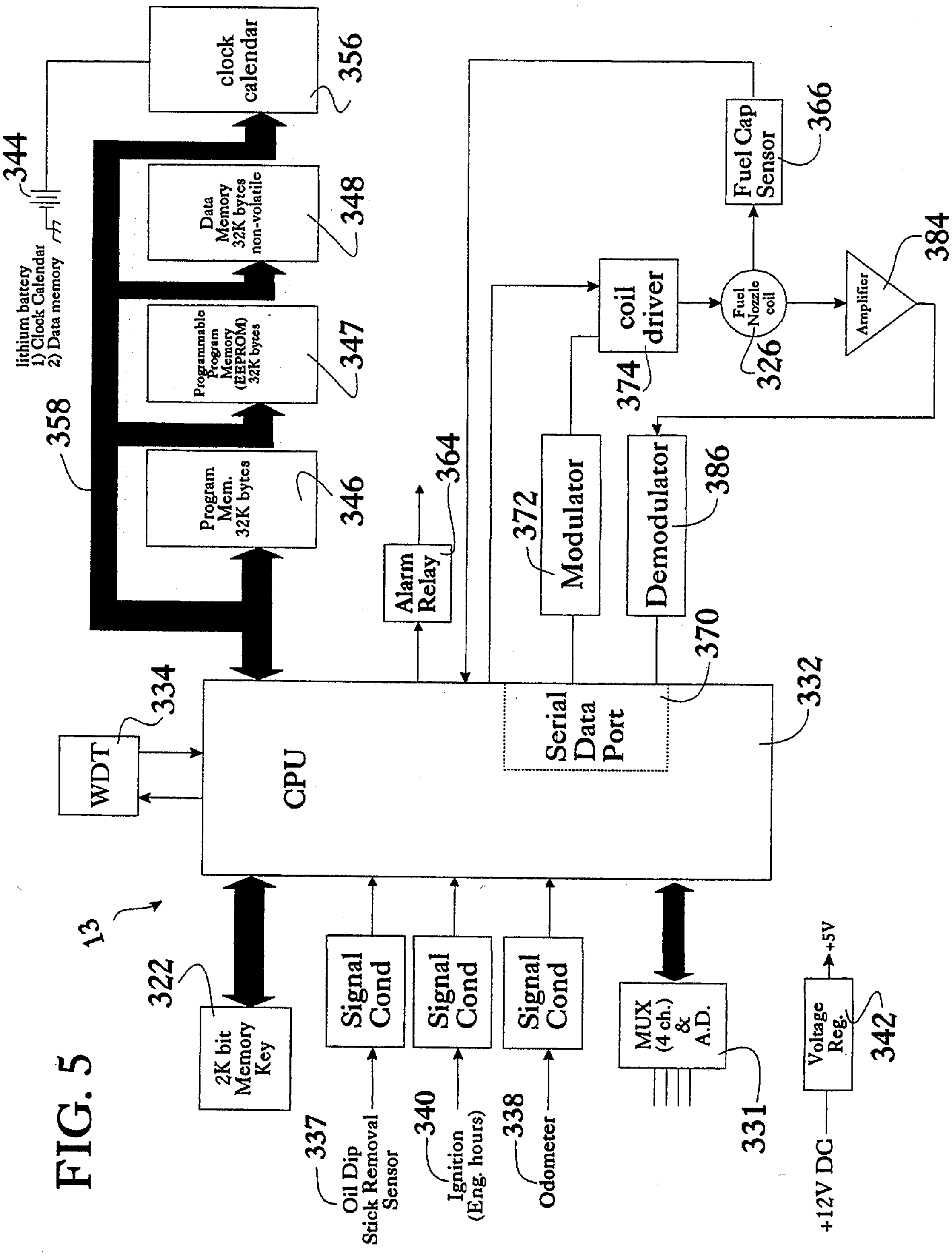
FIG. 5 is a schematic block diagram of a mobile equipment identification module portion of the apparatus of the present invention.

An additional application of the invention is the mobile construction equipment identification module 13 (FIG. 5). As with the automobile identification module 11, a 2K bit memory key 322 or a 64K bit memory key (not shown) may be used to input the company authorization code for fueling, the operator identification code and other such information for downloading to the mobile construction equipment identification module 13. All other features remain substantially unchanged. An additional capacity is provided by the four channel multiplexor and analog to digital convertor 331 which permits four transponders to be connected to the central processing unit 332 for monitoring of operating conditions of the construction equipment on which the identification module 13 is mounted. For example, engine oil level could be monitored and connected to an alarm, and so on.

The module 13 has particular applicability in the airline industry wherein the fuel filler necks of the airplane tanks are equipped with coils 326 and fuel is delivered either from a stationary tank equipped with a module 24 or a pump truck having a module 17 as described below. The modules would communicate and interact to ensure that only the proper type of fuel was delivered, to automatically record on the airplane and at the fuel delivery device the type of fuel delivered, the date and time, quantity, operator identification, and other useful information.

The invention also contemplates a low power identification module 15 (FIG. 6) for use on equipment which does not include a battery or other power means. The low power identification module 15 has recorded in nonvolatile RAM 441 a company, vehicle, and fuel type code. This code is recognized by fuel pumps that are owned by the owner of the equipment on which the low power identification module 15 is mounted. The low power identification module 15 remains inert until a threshold detector 443 is breached after which power is provided from the lithium battery 447 through the voltage switch 445 to the central processing unit 432.

Figure 8:
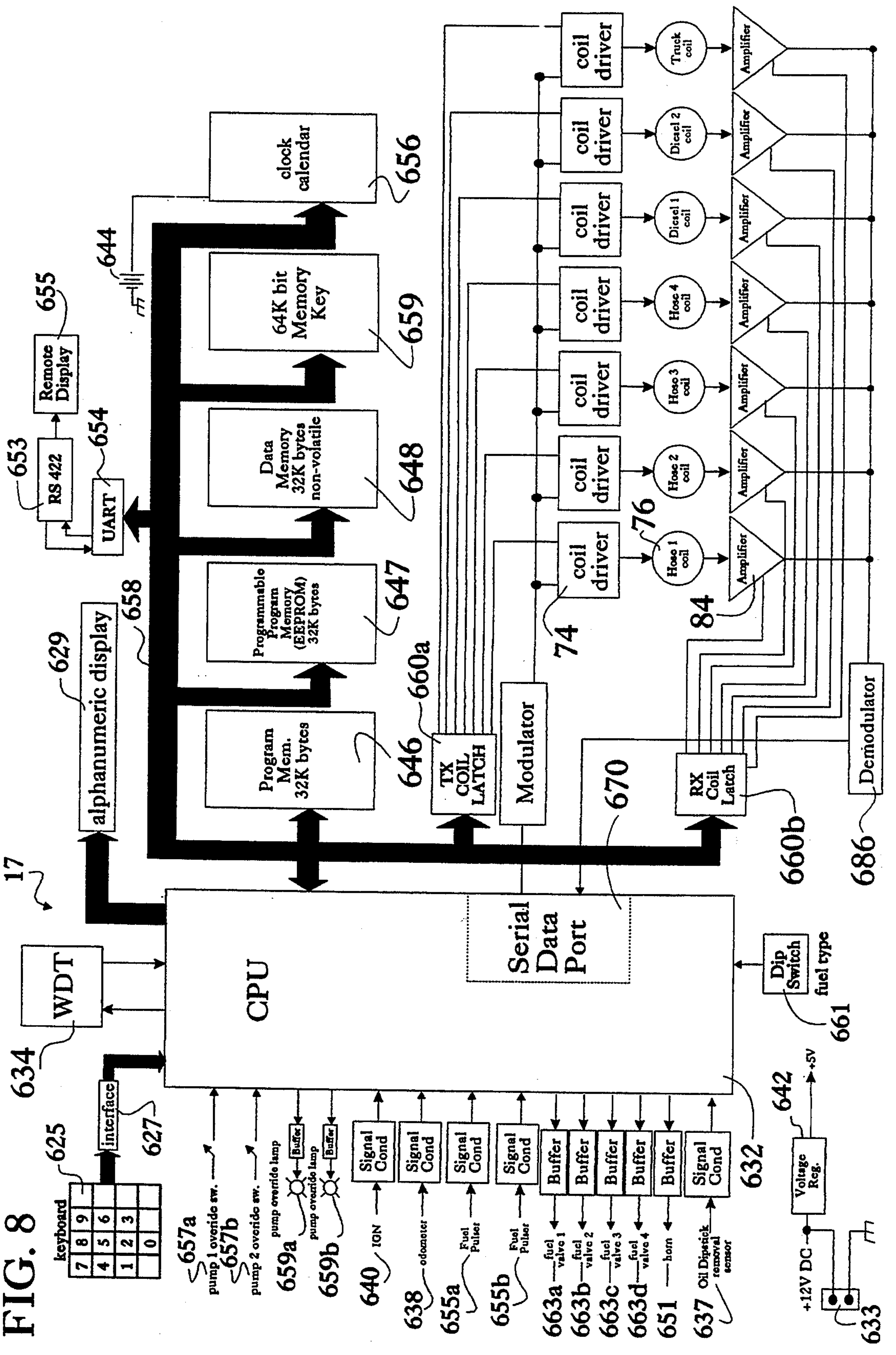
FIG. 8 is a schematic block diagram of a fuel pump truck module portion of the apparatus of the present invention.

The invention further contemplates that fuel may be delivered from a mobile pump truck to which is attached a pump truck identification module 17 (FIG. 8). The pump truck identification module 17 is adapted to accommodate a plurality of fuel delivery tanks, which in the preferred embodiment number four. Additionally, a coil is provided around the filler neck of the tanks to record fuel that is input into the pump truck. The pump truck identification module 17 is also adapted to provide for the delivery of fuel from each of the four separate tanks by way of the fuel valve 663. Fueling data captured by the pump truck identification module 17 includes the name of the authorized operator, the date, time, pump truck identification code, engine hours, odometer reading, the identification code of the mobile equipment to which fuel is being delivered, the operator I.D. of the mobile equipment, the odometer, engine hours, fuel type, and number of gallons delivered to the mobile equipment. As with the fuel pump identification module 24, continuity of signal is required for security purposes such that the delivery of fuel is interrupted if the fuel nozzle is removed from the filler neck of an authorized vehicle or piece of mobile equipment.

Fueling may also be done in an override condition, wherein the data captured includes the name of the authorized operator of the pump truck, the date, time, pump truck I.D. number, engine hours, odometer, fuel type, and number of gallons delivered. The system may be overridden only when an authorized memory key is inserted and the operator engages an override switch.

Of course, use of a memory key as a customer identification and fuel delivery authorization device could be employed with any of the other modules to permit the delivery of fuel from a tank equipped with a module to a non-equipped vehicle or tank.

A reel-mounted hose is frequently used for the dispensing of fuel from the pump trucks. This fuel nozzle may also be used to communicate data and information with a vehicle or piece of mobile equipment. For this communication, a coil is located on the hub of the hose reel and a corresponding stationary coal is located adjacent thereto and mounted on the pump truck. In this way, communication proximity is maintained regardless of the rotational position of the hose reel.

The controls and fuel nozzles and hoses of a fuel pump truck are typically located at the rear of the truck. To provide information to the operator during a fuel delivery operation, the amount of fuel being delivered and, possibly, the type of fuel, time and date, and customer identification information, is displayed on a remote display 655 located at the rear of the pump truck. The remote display 655 is connected to the bus 658 by a UART 654 and an RS422 communication driver 653. A printer (not shown) may be located on the pump truck for the generation of invoices and the like so that a hard copy of the fuel delivery transaction can be left with the customer.

The invention also contemplates a stationary fuel tank identification module 19 (FIG. 9) of similar structure and function as the identification modules described above. The stationary fuel tank identification module 19 may be powered either by battery, solar and battery, a direct power link (either 110 volts AC or 12 volts DC) or an umbilical cord from a pump truck. The identification module 19 controls a pair of solenoid fuel valves, standard delivery valve 763*a* and fast delivery valve 763*b*. The standard delivery valve 763*a* is used if fuel is being pumped from the stationary fuel tank to the fuel tank of a vehicle. Alternatively, the fast delivery valve 763*b* and associated nozzle 773 are used if fuel is being delivered to a pump truck.

Communication of data and information between the stationary fuel tank module 19 and a vehicle is accomplished through an antenna mounted on the fuel nozzle and one on the filler neck of the vehicle. Again, the fuel delivery operation is interrupted if continuity of communication between the respective coils is interrupted for more than one second.

The stationary fuel tank identification module 19 is useful in association with storage tanks that are either above or below ground or which store pressurized fluids, such as propane, oxygen, or ammonia. Alternatively, the nonmobile equipment module 15 or obvious variations thereof may be employed at stationary tank locations to provide, for example, customer identification, authorization codes and credit account information attendant to a fuel or other fluid delivery transaction.

A 2K memory key 722 may be used for an operator key and override of the fuel security system. The 64K memory key 759 may also be used for authorized downloading of fueling data information that has been stored by the stationary fuel tank identification module 19 over an extended period of time.

As with the other fuel delivery modules, the system may be overridden with an authorized memory key. A key pad can be added to input data for vehicles not equipped with an appropriate vehicle identification module. The stationary fuel tank module 19 may either be connected to a remote computer or data storage unit for on-line communication of fuel delivery transactions, or such information may be stored at the stationary tank identification module 19 and downloaded to the 64K memory key 759 which may then be transported to the remote processing location.

Figure 10:
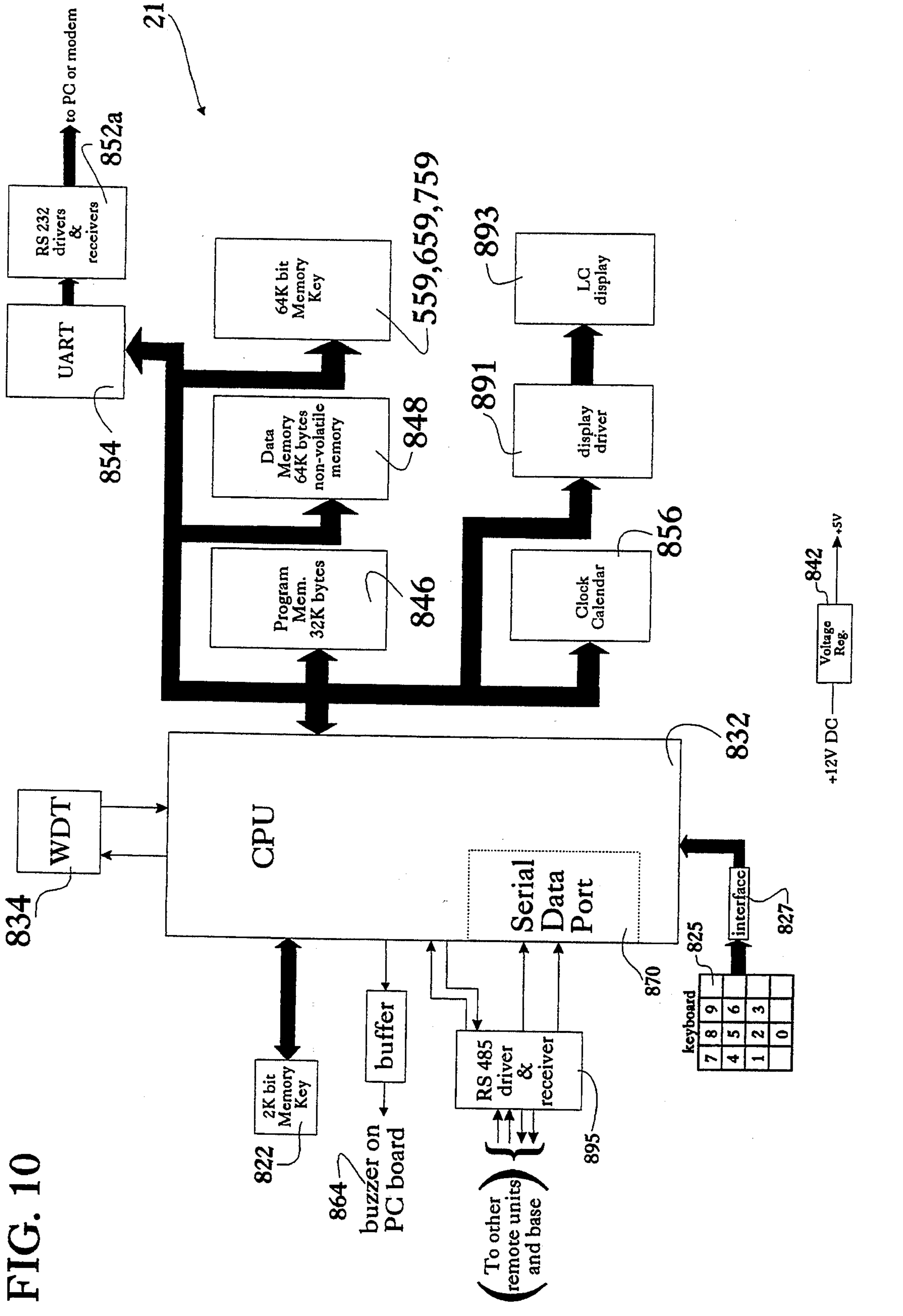
FIG. 10 is a schematic block diagram of a memory key reader module portion of the apparatus of the present invention.

Fuel delivery transaction information and data recorded on the memory keys 559,659, and 759 is downloaded for further processing by a memory key reader module 21 as illustrated in FIG. 10, with 800 series numbers identifying elements corresponding to elements of other modules described previously. The 64k bit memory key 559, 659, or 759 is coded to be identified by the memory key reader module 21 as an authorized transaction information key. It inputs information and data stored on it regarding fuel delivery transactions made from a fuel pump, a pump truck, or a stationary tank. The information and data is stored by the memory key reader module 21 for subsequent transfer via an RS485 link 895 to another computer. A liquid crystal display 893 and driver 891 are provided to display time and date and prompts from the program controlling the memory key reader module 21.

The preferred embodiment described herein is a liquid petroleum fuel delivery system. The invention can, of course, be used with a delivery system for any fluid, such as water, oxygen, ammonia, solvents, herbicides and pesticides, and so on.

I claim:

1. Apparatus for two-way communication of information between a fluid container and a fluid delivery system, wherein the apparatus has a first information storage and retrieval device associated with the fluid delivery system in which information regarding a fluid delivery transaction is storable; means for transmitting and receiving information between the fluid container and the fluid delivery system; security means for authorizing delivery of fluid to the fluid container only upon the transmission from the fluid container of a first identification signal approved by the first information device; and means associated with the fluid container for generating the first identification signal, the apparatus comprising:

(a) a second information storage and retrieval device associated with the fluid container and having means in which information regarding the fluid transaction is storable; and (b) wherein the means for transmitting and receiving information comprises means for storing the information relative to the fluid delivery transaction in said second information device and in which information regarding the fluid delivery transaction is storable; and (c) wherein the security means is further provided with means for discontinuing the fluid delivery transaction if the security means does not receive from the fluid container a series of identification signals transmitted throughout the fluid delivery transaction.

2. Apparatus as defined in claim 1, further comprising means for communicating information regarding the fluid delivery transaction between the first information device and a remote location.

3. Apparatus as defined in claim 2, wherein said remote location includes a credit/debit account for payment of fluid delivered in the fluid delivery transaction.

4. Apparatus as defined in claim 1, further comprising means for communicating information regarding the fluid delivery transaction between said second information device and a remote location.

5. Apparatus as defined in claim 4, wherein said remote location includes a credit/debit account for payment of fluid delivered in the fluid delivery transaction.

6. Apparatus as defined in claim 1, wherein the fluid container is a fuel tank of a vehicle.

7. Apparatus as defined in claim 6, wherein said second information device includes a digital memory device on which is recorded information regarding the operational history of the vehicle.

8. Apparatus as defined in claim 7, wherein said operational history information includes information selected from the group consisting of current mileage, mileage elapsed since preceding fluid delivery, vehicle identification number, wonder of the vehicle, current hours the vehicle has operated, hours of operation of the vehicle since preceding fuel delivery, identity of operator of the vehicle, diagnostic information retrieved form a Society of Automotive Engineers J1708 Diagnostic Bus, and billing information.

9. Apparatus as defined in claim 6, wherein the information transmitting and receiving means comprises:

(a) a first antennae in communication with the first information device;

(b) a second antennae in communication with said second information device;

(c) and wherein the first identification signal and the fluid delivery transaction information are exchanged via signals transmitted and received between said first and second antennae.

10. Apparatus as defined in claim 9, wherein said first antenna comprises a first inductive coil communication link associated with the fluid container and said second antenna comprises a second inductive coil communication link associated with the fluid delivery system.

11. Apparatus as defined in claim 10, further comprising:

(a) a fluid delivery orifice associated with the fluid container;

(b) a fluid delivery nozzle associated with the fluid delivery system;

(c) wherein said first inductive coil communication link is associated with said fluid delivery orifice;

(d) wherein said second inductive coil communication link is associated with said fluid delivery nozzle; and (e) wherein said coils are in transmitting and receiving alignment and proximity when said fluid delivery nozzle is inserted into said fluid delivery orifice during said fluid delivery transaction.

* * * * *